(12) United States Patent
Nishi et al.

(10) Patent No.: US 8,982,555 B2
(45) Date of Patent: Mar. 17, 2015

(54) ELECTRONIC DEVICE HAVING PASSIVE COOLING

(71) Applicant: Intel Corporation, Santa Clara, CA (US)

(72) Inventors: Yoshifumi Nishi, Ushiku (JP); Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 13/630,894

(22) Filed: Sep. 28, 2012

(65) Prior Publication Data

US 2014/0092542 A1    Apr. 3, 2014

(51) Int. Cl.
*H05K 7/20*    (2006.01)
*G06F 1/16*    (2006.01)
*G06F 1/20*    (2006.01)

(52) U.S. Cl.
CPC .............. *G06F 1/1616* (2013.01); *G06F 1/203* (2013.01)
USPC .......... 361/692; 361/690; 165/185; 174/15.1; 174/16.1

(58) Field of Classification Search
CPC .............. H05K 7/20; G06F 1/20; G06F 1/203
USPC ........ 361/679.01–679.61, 688–723; 165/185; 174/15.1–15.2, 16.1–16.3
See application file for complete search history.

(56) References Cited

U.S. PATENT DOCUMENTS

| | | | |
|---|---|---|---|
| 5,621,613 A * | 4/1997 | Haley et al. ............... | 361/679.27 |
| 5,732,765 A * | 3/1998 | Drolen et al. .................. | 165/41 |
| 5,880,929 A | 3/1999 | Bhatia | |
| 5,882,929 A * | 3/1999 | Fofonoff et al. ............... | 435/395 |
| 5,910,883 A * | 6/1999 | Cipolla et al. ........... | 361/679.27 |
| 6,118,655 A * | 9/2000 | Mecredy et al. ......... | 361/679.47 |
| 6,125,035 A * | 9/2000 | Hood et al. ............... | 361/679.47 |
| 6,167,949 B1 * | 1/2001 | Langley et al. .......... | 165/104.33 |
| 6,185,102 B1 * | 2/2001 | Shou et al. ..................... | 361/704 |
| 6,250,378 B1 * | 6/2001 | Kobayashi ............... | 165/104.33 |
| 6,253,836 B1 * | 7/2001 | Mitchell ......................... | 165/86 |
| 6,341,062 B1 * | 1/2002 | Patel ........................ | 361/679.54 |

(Continued)

FOREIGN PATENT DOCUMENTS

| | | |
|---|---|---|
| JP | 2000-148304 | 5/2000 |
| KR | 10-2002-0032737 | 5/2002 |

(Continued)

OTHER PUBLICATIONS

Written Opinion and International Search Report for Application PCT/US2011/067514 dated Sep. 25, 2012.

(Continued)

*Primary Examiner* — David M Sinclair
*Assistant Examiner* — Robert Brown
(74) *Attorney, Agent, or Firm* — Ked & Associates (57) ABSTRACT

An electronic device is provided that includes a base having a top portion and a bottom portion. The bottom portion may include a first bottom part and a second bottom part. The first bottom part may form a first plane, and the second bottom part may form a second plane, the second plane being non-planar with the first plane. The second bottom part may include an input opening. The top portion of the base may include an output opening. The input opening and the output opening may allow air to flow from behind the electronic device to over the base.

26 Claims, 8 Drawing Sheets

(56) References Cited

U.S. PATENT DOCUMENTS

| | | | |
|---|---|---|---|
| 6,493,222 B2* | 12/2002 | DiFonzo et al. | 361/679.48 |
| 7,505,255 B2* | 3/2009 | Wu | 361/679.27 |
| 8,355,248 B2* | 1/2013 | Nishi | 361/679.55 |
| 8,363,392 B2* | 1/2013 | Tanaka | 361/679.02 |
| 2002/0012228 A1* | 1/2002 | Ozaki et al. | 361/687 |
| 2002/0018335 A1* | 2/2002 | Koizumi | 361/687 |
| 2002/0075647 A1* | 6/2002 | DiFonzo et al. | 361/687 |
| 2004/0042172 A1* | 3/2004 | Kusaka et al. | 361/687 |
| 2005/0105273 A1 | 5/2005 | Tanaka et al. | |
| 2006/0028795 A1 | 2/2006 | Furuya | |
| 2006/0082966 A1* | 4/2006 | Lev et al. | 361/687 |
| 2006/0171113 A1 | 8/2006 | Wu | |
| 2006/0243878 A1* | 11/2006 | Saad | 248/346.01 |
| 2008/0074842 A1* | 3/2008 | Tracy et al. | 361/695 |
| 2008/0212278 A1* | 9/2008 | DeLuga et al. | 361/690 |
| 2009/0268392 A1* | 10/2009 | Cheng et al. | 361/679.52 |
| 2010/0079945 A1* | 4/2010 | Wang | 361/695 |
| 2010/0097764 A1* | 4/2010 | Iikubo | 361/697 |
| 2010/0134976 A1* | 6/2010 | Kuo | 361/695 |
| 2010/0134977 A1* | 6/2010 | Chang et al. | 361/695 |
| 2010/0165567 A1* | 7/2010 | Shih et al. | 361/679.48 |
| 2010/0214743 A1* | 8/2010 | Huang et al. | 361/692 |
| 2010/0220439 A1* | 9/2010 | Qin | 361/679.47 |
| 2010/0238619 A1* | 9/2010 | Shirasaka | 361/679.08 |
| 2010/0296946 A1* | 11/2010 | Chen et al. | 417/44.2 |
| 2011/0075352 A1* | 3/2011 | Tye et al. | 361/679.46 |
| 2011/0134605 A1* | 6/2011 | Chou et al. | 361/679.48 |
| 2011/0149495 A1* | 6/2011 | Mongia et al. | 361/679.08 |
| 2011/0205699 A1* | 8/2011 | Iijima | 361/679.08 |
| 2011/0242757 A1 | 10/2011 | Tracy et al. | |
| 2011/0279974 A1* | 11/2011 | Fujiwara | 361/692 |
| 2011/0279977 A1* | 11/2011 | Tanaka | 361/697 |
| 2011/0292592 A1* | 12/2011 | Senatori | 361/679.46 |
| 2011/0310557 A1* | 12/2011 | Ooe | 361/692 |
| 2012/0113593 A1* | 5/2012 | Hsu et al. | 361/696 |
| 2012/0127652 A1* | 5/2012 | Lin et al. | 361/679.46 |
| 2012/0127663 A1* | 5/2012 | Mochizuki et al. | 361/692 |
| 2012/0130545 A1* | 5/2012 | Haugh et al. | 700/276 |
| 2012/0236517 A1* | 9/2012 | Nakajima | 361/752 |
| 2012/0327581 A1* | 12/2012 | Pais et al. | 361/679.26 |
| 2013/0003284 A1* | 1/2013 | Massaro et al. | 361/679.28 |
| 2013/0027873 A1* | 1/2013 | Chen et al. | 361/679.46 |
| 2013/0027877 A1* | 1/2013 | Yang et al. | 361/692 |
| 2013/0063889 A1* | 3/2013 | Yee et al. | 361/679.48 |
| 2013/0077241 A1* | 3/2013 | Senatori | 361/694 |
| 2013/0175018 A1* | 7/2013 | Huang | 165/185 |
| 2013/0225065 A1* | 8/2013 | Lee | 454/343 |
| 2013/0286292 A1* | 10/2013 | Yamaguchi et al. | 348/725 |
| 2014/0009888 A1 | 1/2014 | MacDonald et al. | |
| 2014/0092544 A1* | 4/2014 | Nishi et al. | 361/679.09 |

FOREIGN PATENT DOCUMENTS

| | | |
|---|---|---|
| WO | WO 2013/100946 | 7/2013 |
| WO | 2014/052185 A1 | 4/2014 |

OTHER PUBLICATIONS

U.S. Appl. No. 13/630,947, filed Sep. 28, 2012, Nishi et al.
International Search Report and Written Opinion dated Jan. 7, 2014 for PCT/US2013/060963.
International Search Report dated Dec. 26, 2013 for corresponding Application No. PCT/US2013/060879.
International Preliminary Report on Patentability and Written Opinion received for PCT Patent Application No. PCT/US2011/067514, mailed on Jul. 10, 2014, 6 Pages.

* cited by examiner

ELECTRONIC DEVICE HAVING PASSIVE COOLING

BACKGROUND

1. Field

Embodiments may relate to a passively cooled electronic device, such as a laptop computer or a notebook computer.

2. Background

Notebook computers and laptop computers may generate heat when operating. A fan may be provided within the notebook computer and/or the laptop computer in order to dissipate the generated heat.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be described with respect to a computer, such as a laptop computer or a notebook computer. However, arrangements and embodiments may be applicable to other electronic devices, such as mobile communication terminals.

Figure 1:
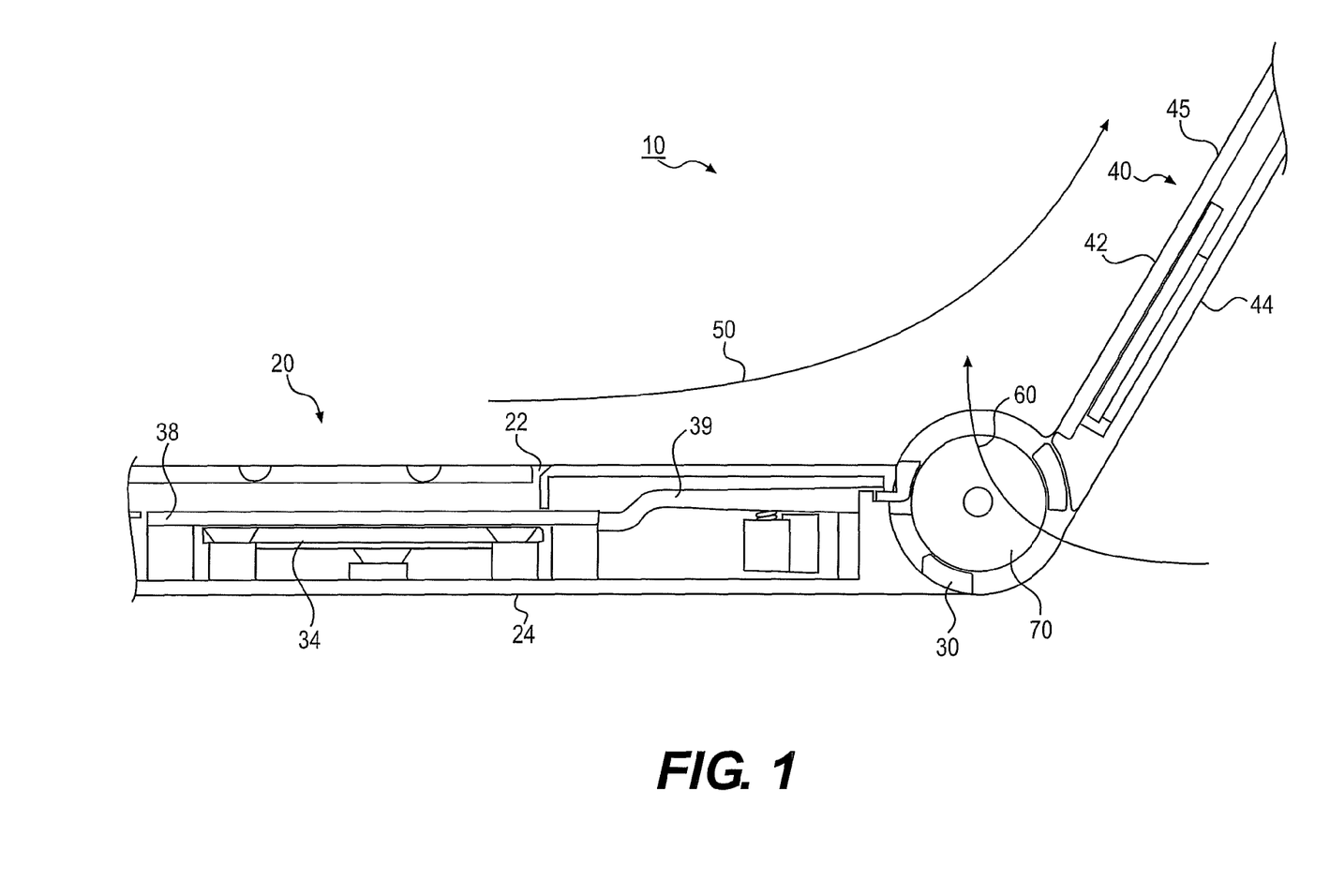
FIG. 1 is a side view of a passively cooled computer according to an example arrangement.

FIG. 1 shows a passively cooled computer according to an example arrangement. Other arrangements and configurations may also be provided.

FIG. 1 shows a passively cooled computer 10 such as a notebook computer or a laptop computer. The computer 10 may include a base 20 and a lid 40 that are coupled together by a hinge device 30. FIG. 1 shows the computer 10 in an opened state (or opened position) in which the lid 40 is separated away from the base 20. The computer 10 may also be provided in a closed state (or closed position) when the lid 40 is closed so as to be adjacent to the base 20.

The base 20 of the computer 10 may support various components such as a processor, a touch pad, a memory, a keyboard, a circuit board, a battery, etc. These components may generate heat during operation of the computer 10.

The lid 40 of the computer 10 may support a display 45 for a user to view during use of the computer 10. The lid 40 may support other electric components. The components of the lid 40 may further generate heat during operation of the computer 10.

When the computer 10 is in an opened state, the keyboard on the base 20 and the display 45 on the lid 40 may be exposed to a user located in front of the computer 10.

The base 20 may include a first side 22 (or top side) and a second side 24 (or bottom side). The lid 40 may include a first side 42 and a second side 44. When the computer 10 is in the opened state (such as shown in FIG. 1), the first side 42 of the lid 40 is separated away from the first side 22 of the base 20. In other words, the keyboard on the first side 22 of the base 20 is exposed to a user and the display 45 on the first side 42 of the lid 40 is exposed to a user. When the computer 10 is in the closed state, the first side 42 of the lid 40 is closed so as to be adjacent to the first side 22 of the base 20. In other words, the keyboard on the first side 22 of the base 20 is not exposed to a user and the display 45 on the first side 42 of the lid 40 is not exposed to a user.

During operation of the computer 10 while the computer 10 is in an opened state, heat generated by the components of the computer 10 may create a convection plume 50, such as a natural convection plume, over the first side 22 of the base 20 and the first side 42 of the lid 40, and to an area above the lid 40. The convection plume 50 is a flow of heat in a direction from the first side 22 toward the first side 42 and subsequently away from the first side 42 (of the lid 40). In FIG. 1, the convection plume 50 flows in a left to right direction and then upward. The convection plume 50 dissipates heat generated by the computer 10. The convection plume 50 may be created without the use of a fan, even though a fan may be provided in the base 20.

The hinge device 30 may allow the lid 40 to rotate (or move) about a rotational axis that is parallel to a width of the lid 40 (or a width of the base 20). The lid 40 may rotate about the rotational axis of the hinge device 30 between the closed state and the opened state.

In at least one arrangement, a passive heat exchange device 70 may be provided in an area of the hinge device 30 between the base 20 and the lid 40. The heat exchange device 70 may be adjacent to the hinge device 30 in an area between the base 20 and the lid 40, and the heat exchange device 70 may create an opening (or openings) in the area between the lid 40 and the base 20. The heat exchange device 70 may be considered passive since it does not directly include a fan.

The heat exchange device 70 may be provided in an area near or at a back end of the base 20. The hinge device 30 may include a first hinge device and a second hinge device spaced apart from the first hinge device. The heat exchange device 70 may be provided in an area between the first hinge device and the second hinge device.

The opening (or openings) created by the heat exchange device 70 may induce an air flow 60 from behind the computer 10 to in front of the computer 10, and into the convection plume 50. That is, the opening(s) of the heat exchange device 70 may allow air to pass from behind the computer 10 and into the convention plume 50. Stated differently, air behind the computer 10 may be sucked into the convection plume 50 via the opening(s) in the heat exchange device 70. This may further dissipate heat from the computer 10.

FIG. 1 also shows components within the base 20 according to an example arrangement. The shown components include a processor 34 on a circuit board, a thermal attacher 38 coupled to the processor 34 and a heat spreader 39 coupled to the thermal attacher 38. The heat spreader 39 may also be considered a heat pipe. The thermal attacher 38 and the heat spreader 39 may also be called a heat dissipating device to dissipate heat from the processor 34 to the heat exchange device 70.

The heat exchange device 70 may be physically connected to the heat spreader 39 (or to the heat dissipating device). Heat generated by the processor 34 (on the circuit board) or other components may be distributed by the thermal attacher 38 and the heat spreader 39 to the heat exchange device 70. The heat exchange device 70 may therefore receive energy or heat generated from the processor 34 and/or other components.

The heat exchange device 70 may include at least one heat pipe and a plurality of fins that extend perpendicularly from an axis of the at least one heat pipe. The at least one heat pipe may be coupled to the heat dissipating device to receive heat from components within the base 20.

The openings of the heat exchange device 70 may allow the induced air flow 60 to flow when the computer 10 is provided in the opened state, such as shown in FIG. 1. The induced air flow 60 that flows through the openings may help dissipate the heat or energy at the heat exchange device 70 to outside of the computer 10. The dissipated heat or energy may be provided to the convection plume 50. The convection plume 50 may dissipate the heat or energy away from (or above) the computer 10.

As shown by the induced air flow 60, air from behind the computer 10 may pass through the heat exchange device 70 and into the convection plume 50. The air may absorb heat provided at the heat exchange device 70, and remove some of the heat from the heat exchange device 70.

When the opening angle of the lid 40 is large, the convention plume 50 may detach away from the lid 40 and the heat exchange device 70 may create its own convection plume (or natural convection plume) in order to dissipate heat.

The heat exchange device 70 and the hinge device 30 may be provided between the base 20 and the lid 40. The heat exchange device 70 may be provided adjacent to the hinge device 30 such that both the heat exchange device 70 and the hinge device 30 are provide in a same area between the base 20 and the lid 40 when the computer is in the opened state. The heat exchange device 70 may be independent of the hinge device 30.

The hinge device 30 may allow the lid 40 to move relative to the base 20 between the closed state (of the computer 10) and the opened state (of the computer 10).

The heat exchange device 70 may take any of a number of specific shapes or types. For example, the heat exchange device 70 may include a number of openings and/or fins to allow the air flow 60 to flow from the rear of the computer 10 to a front of the computer 10. The fins may extend perpendicularly from a heat pipe. The opening(s) or fins may provide an air flow passage from the rear to the front of the lid 40 such that the air flow 60 joins the convection plume 50. The heat exchange device 70 may be unique in that air flows from a rear to a front and ultimately to the convection plume 50. The air from the rear of the computer 10 may be sucked into the convection plume 50 via the openings of the heat exchange device 70, and thereby dissipate the heat from the heat exchange device 70.

The heat exchange device 70 may be physically connected to the base 10, and more specifically may be connected to the heat spreader 39. The heat exchange device 70 may be a passive device since it does not specifically operate using a fan to dissipate heat. The flow of air by the convection plume 50 may receive the induced air flow 60.

Figure 2:
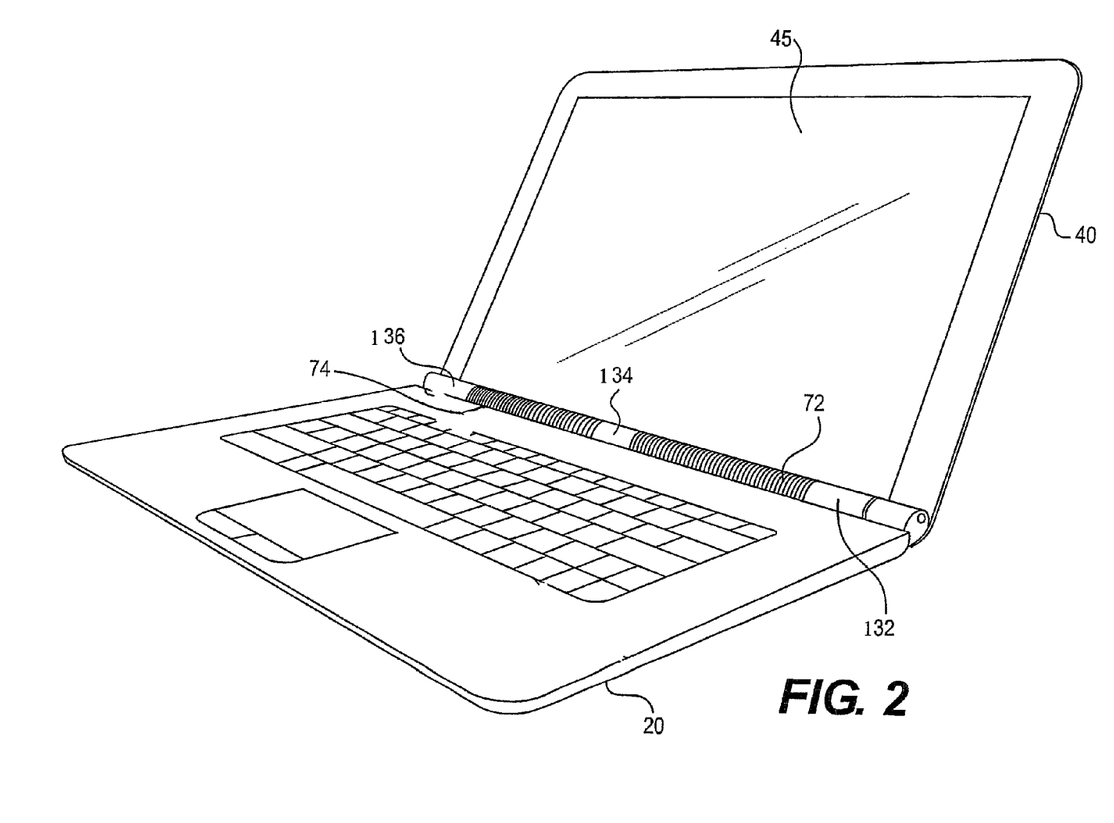
FIG. 2 shows a passively cooled computer according to an example arrangement.

FIG. 2 shows a passively cooled computer according to an example arrangement. Other arrangements and configurations are also within the scope of the present invention.

FIG. 2 shows the computer 10 in the opened state such that the lid 40 is opened when compared to the base 20. FIG. 2 shows the hinge device 30 as a first hinge component 132, a second hinge component 134 and a third hinge component 136. Each of the first, second and third components 132, 134, 136 of the hinge device 30 allow the lid 40 to move (or rotate) relative to the base 20.

FIG. 2 also shows the heat exchange device 70 as first openings 72 for a heat exchange component and second openings 74 for a heat exchange component. The heat exchange components may be fixedly attached to the base 20 such that the heat exchange components and the openings 72, 74 do not move (or rotate) when the lid 40 is opened. In other words, the first openings 72 and the second openings 74 are stationary when the lid 40 moves.

The heat exchange components may include a plurality of fins, such as extending from a heat pipe, for example. The fins may be made of a metallic material such as copper or aluminum, for example. The fins may include fins of copper or fins of aluminum, for example.

The openings 72 may be provided between a rear of the heat exchange 70 and a front of the heat exchange 70. The air flowing through the openings 72 may receive heat or energy from the fins, and dissipate the heat or energy to the convection plume 50 located in front of the display 45 on the lid 40.

The openings 72 may be provided between a rear of the heat exchange 70 and a front of the heat exchange 70. The air flowing through the openings 74 may receive heat or energy from the fins, and dissipate the heat or energy to the natural convection plume 50 located in front of the display on the lid 40.

Figure 3:
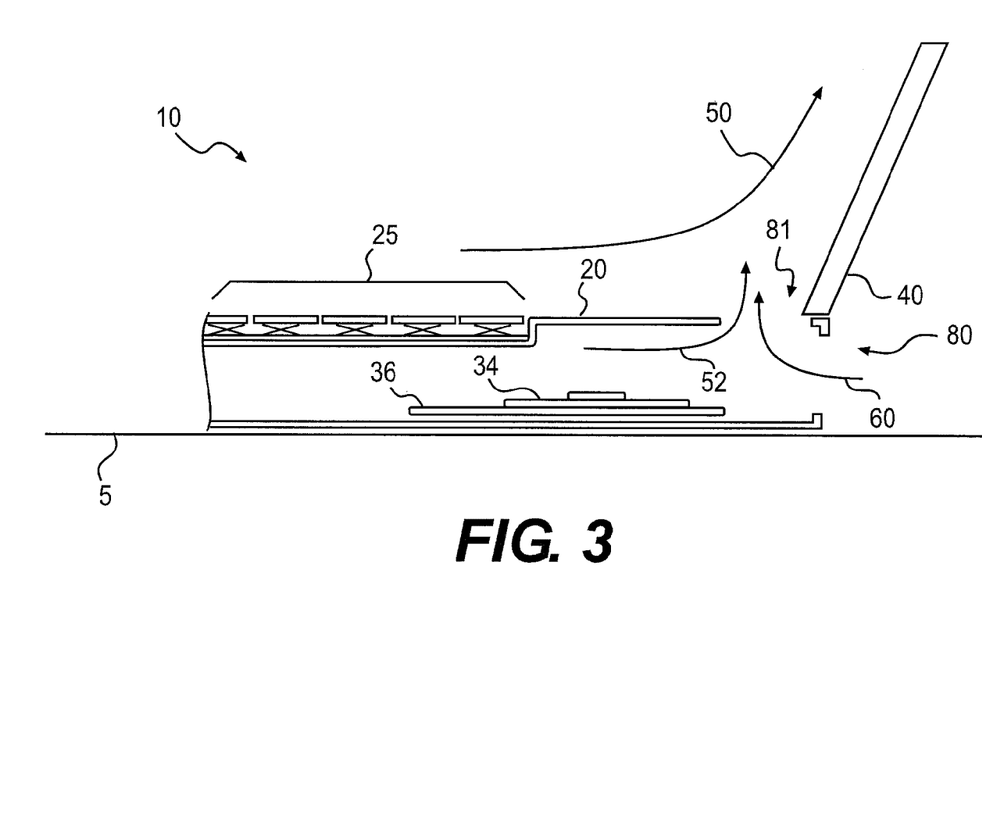
FIG. 3 is a cross-sectional side view of a passively cooled computer according to an example embodiment.
Figure 4:
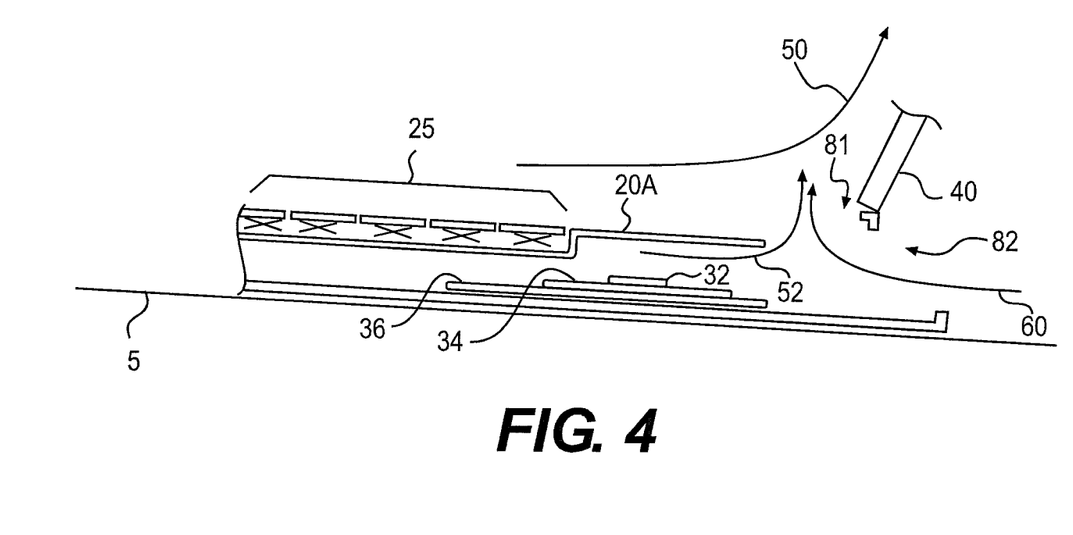
FIG. 4 is a cross-sectional side view of a passively cooled computer according to an example embodiment.

FIG. 3 is a cross-sectional side view of a passively cooled computer (or electronic device) according to an example arrangement. FIG. 4 is a cross-sectional side view of a passively cooled computer (or electronic device) according to an example arrangement. Other arrangements and configurations may also be provided.

More specifically, FIG. 3 shows the computer 10 having the lid 40 and the base 20 in an opened state (or opened position). A hinge device may be coupled to the lid 40 and to the base 20.

The base 20 of the computer 10 may be provided on a support surface 5, such as a flat surface of a desk or a table.

The base 20 of the computer 10 may support various components such as a keyboard 25 having a plurality of keys, and/or a touch pad. The base 20 of the computer 10 may also include other electronic components such as a circuit board 36 and the processor 34.

The base 20 of the computer 10 may include an opening 80 at a backside of the base 20. The opening 80 may be provided on a rear surface of the base 20.

FIG. 3 also shows that the air flow 60 comes from behind the computer 10, goes through the opening 80 (of the base 20) and comes out from the base 10 and into the convection plume 50 in front of the lid 40. The air flow 60 may be through vents (or the opening 80) in the base 20 to allow the air flow 60 to enhance cooling of the computer 10. However, as a thickness of the base 20 decreases, then it may be more difficult to draw air through the opening 80 due to a limited open area for venting.

The convection plume 50 may pull or suck air 52 from an area at the processor 34 (or other component). The air 52 may be pulled out through opening 81.

FIG. 4 shows the computer 10 having a base 20A that is thinner than the base 20 (of FIG. 3). The base 20A may include an opening 82 at a backside (or rear surface) of the base 20A. The opening 82 (FIG. 4) may be smaller than the opening 80 (FIG. 3), and thus may inhibit air flow through the opening 82 as compared to the opening 80.

Embodiments may provide a computer (or electronic device) that includes a base having a wedged bottom portion (or wedged bottom surface). The base may have a bottom portion that includes a first bottom part and a second bottom part. The first bottom part may contact a support surface, such as a desk or table surface, when the computer is provided on the support surface. The second bottom part may be provided at a different angle than the first bottom part, such that the second bottom part may not contact the support surface when the computer is provided on the support surface. The first bottom part and the second bottom part may therefore be provided in a wedge configuration, or other configurations. In view of the wedge configuration, or other configurations, an input opening may be provided on the second bottom part (of the bottom portion) of the base. This may allow a better air flow into and through the base. The airflow may exit from the base at an output opening.

The convection plume 50 may pull or suck air 52 from an area at the processor 34 (or other component). The air 52 may be pulled out through opening 81.

Figure 5:
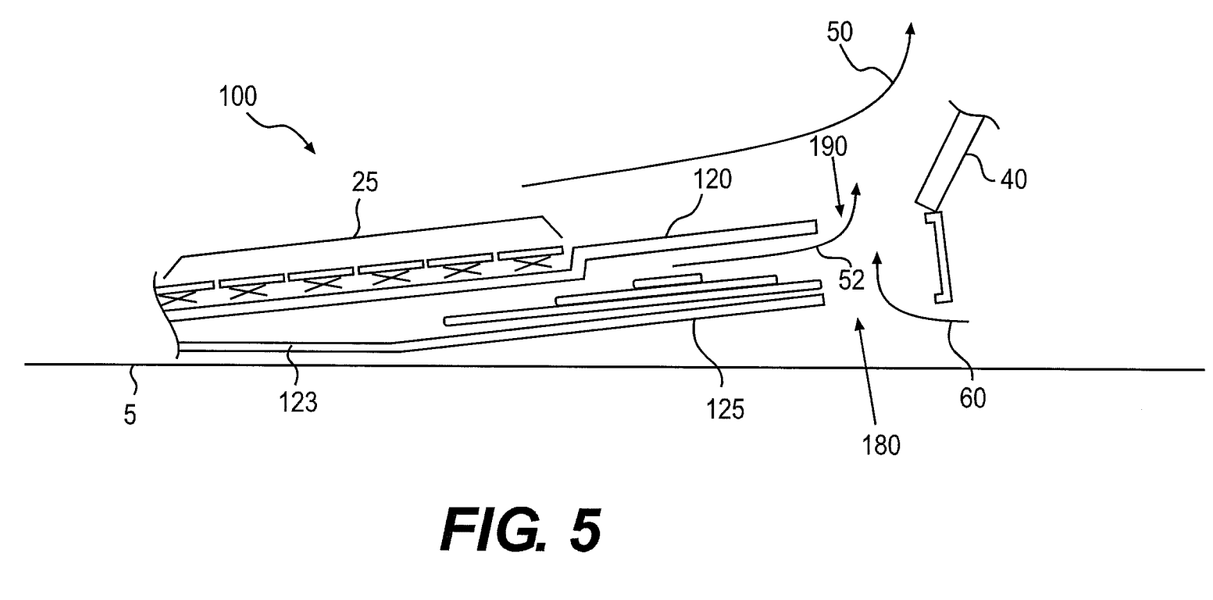
FIG. 5 is a cross-sectional side view of a passively cooled computer according to an example embodiment.

FIG. 5 is a cross-sectional side view of a passively cooled computer (or electronic device) according to an example embodiment. Other embodiments and configurations may also be provided.

More specifically, FIG. 5 shows a computer 100 having a base 120 and the lid 40 in an opened state (or opened position). A hinge device may be coupled to the lid 40 and to the base 120.

The base 120 of the computer 100 may be provided on the support surface 5, such as a flat surface of a desk or a table.

FIG. 5 shows that the base 120 includes a top portion and a bottom portion. The bottom portion may include a first bottom part 123 and a second bottom part 125. The first bottom part 123 may be a substantially flat surface (or define a first plane), and the second bottom part 125 may be a substantially flat surface (or define a second plane). The first bottom part 123 and the second bottom part 125 may be provided in a wedge configuration, for example. In the wedge configuration, the second bottom part 125 may not be parallel to the first bottom part 123. The second bottom part 125 may not be aligned with the first bottom part 123. The first plane of the first bottom part 123 is not parallel (i.e., is non-planar) to the second plane of the second bottom part 125. The first bottom part 123 and the second bottom part 125 may be provided in configurations other than a wedge configuration.

For example, when the computer 100 (or electronic device) is provided on the support surface 5, the first bottom part 123 may contact the support surface 5 and the second bottom part 125 may be raised from the surface 5, due to the wedge configuration (or shape) of the bottom of the base 120. As one example, the second bottom part 125 may be raised such that is a sufficiently large gap between the second bottom part 125 and the support surface 5 for the air flow 60. As one example, the gap may be 10 mm, although other dimensions for the gap may also be provided. This may allow air to be provided under the second bottom part 125.

The first bottom part 123 may support the computer 100 (or electronic device) on the support surface. The second bottom part 125 may be raised from the support surface 5 when the first bottom part 123 supports the computer 100 (or electronic device) on the support surface 5.

The second bottom part 125 may include an input opening 180 that allows air to flow under the second bottom surface 125 (from the rear of the computer 10), through the input opening 180, through the base 120 and out through (or exit) an output opening 190 (of the base 120) to an area in front of the lid 40. The air flow 60 may be a vertical flow (or substantially vertical flow) through the base 120 to a convection plume (or natural convection plume) over the base 120 and in front of the lid 40.

The output opening 190 of a top portion of the base 120 may be aligned with the input opening 180 of a bottom portion of the base 120.

A heat exchange device may be provided within the base 120 and within the path of the air flow 60. The heat exchange device may include fins, for example.

The convection plume 50 may pull or suck air 52 from an area at the processor 34 (or other component). The air 52 may be pulled out through opening 190.

Figure 6:
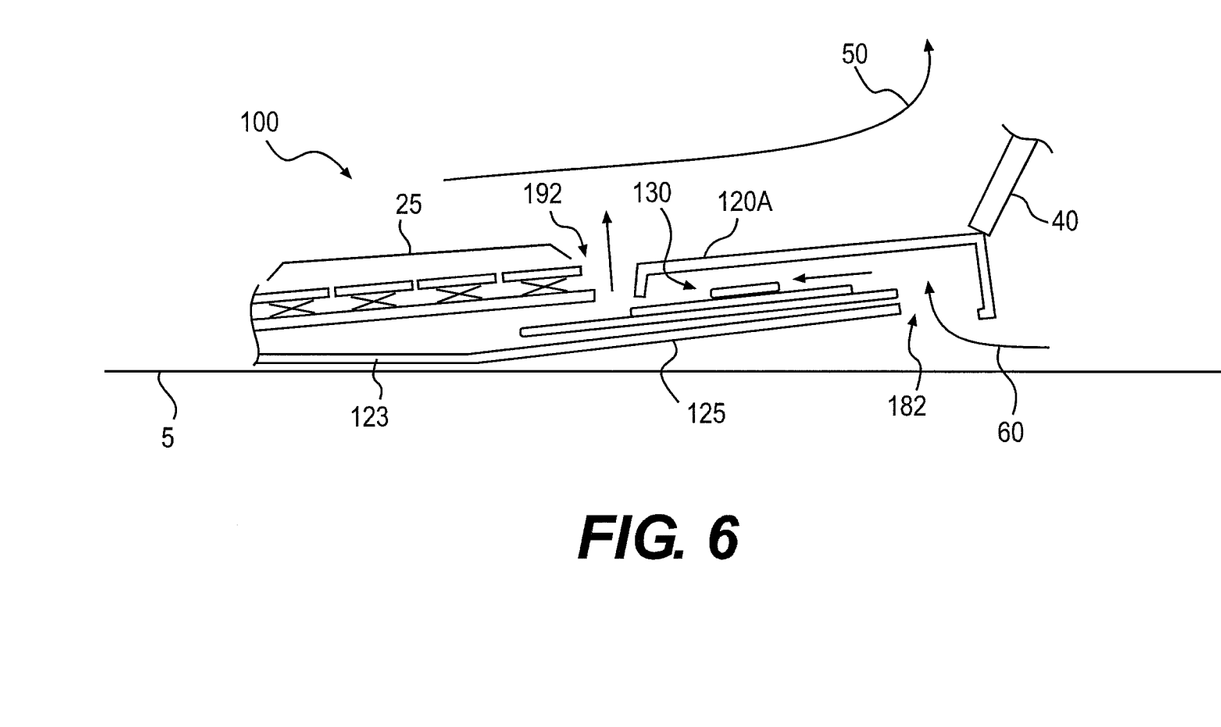
FIG. 6 is a cross-sectional side view of a passively cooled computer according to an example embodiment.

FIG. 6 is a cross-sectional side view of a passively cooled computer (or electronic device) according to an example embodiment. Other embodiments and configurations may also be provided.

More specifically, FIG. 6 shows the computer 100 having a base 120A and the lid 40 in an opened state (or opened position). A hinge device may be coupled to the lid 40 and to the base 120A.

The base 120A of the computer 100 may be provided on the support surface 5, such as a flat surface of a desk or a table.

FIG. 6 shows that the base 120A includes a top portion and a bottom portion. The bottom portion may include the first bottom part 123 and the second bottom part 125. The first bottom part 123 may be a substantially flat surface (or define a first plane), and the second bottom part 125 may be a substantially flat surface (or define a second plane). The first bottom part 123 and the second bottom part 125 may be provided in a wedge configuration, for example. In the wedge configuration, the second bottom part 125 may not be parallel to the first bottom part 123. The second bottom part 125 may not be aligned with the first bottom part 123. The first plane of the first bottom part 123 is not parallel (i.e., is non-planar) to the second plane of the second bottom part 125. The first bottom part 123 and the second bottom part 125 may be provided in configurations other than a wedge configuration.

For example, when the computer 100 (or electronic device) is provided on the support surface 5, the first bottom part 123 may contact the support surface 5 and the second bottom part 125 may be raised from the support surface 5, due to the wedge configuration (or shape) of the bottom of the base 120A. As stated above, the second bottom part 125 may be raised (from the support surface) such that there is a sufficiently large gap between the second bottom part 125 and the support surface 5 for the air flow 60. This may allow air to be provided under the second bottom part 125.

The first bottom part 123 may support the computer 100 (or electronic device) on the support surface. The second bottom part 125 may be raised from the support surface 5 when the first bottom part 123 supports the computer 100 (or electronic device) on the support surface 5.

The second bottom part 125 may include an input opening 182 that allows air to flow under the second bottom surface 125 (from the rear of the computer 10), through the input opening 182, along an inside portion 130 of the base 120A, and out through (or exit) an output opening 192 (of the base 120A) to an area over the base 120A. The air flow 60 may be into the input opening 182, then in a longitudinal direction along the inside portion 130 of the base 120A, and then out of the base 120A through the output opening 192 to a convection plume (or natural convection plume) over the base 120A and in front of the lid 40.

The inside portion 130 of the base 120A may be over the processor 34 and the circuit board 36, for example. The air flow 60 may help dissipate heat from the processor 34, the circuit board 36 and/or other components.

The output opening 192 (of the base 120A) may be provided at an edge of the keyboard 25 on the base 120A. For example, the output opening 192 may be provided at one or a plurality of edge areas of the keyboard 25. FIG. 6 specifically shows the output opening 192 at a top edge of the keyboard 25. The output opening 192 may be an opening along an entire top edge of the keyboard 25, or the output opening 192 may be an opening (or openings) along only part of the top edge of the keyboard 25.

The output opening 192 (or openings) may also (or alternatively) be provided along a first side edge of the keyboard 25, a second side edge of the keyboard 25, and/or a bottom edge of the keyboard 25.

The output opening (or openings) may also (or alternatively) be provided along any edge of a touch pad on the base 120A. The output opening (or openings) may be provided at other areas of a top surface of the base 120A.

The air flow 60 that enters into the base 120A through the input opening 182 may pass through the inside portion 130 of the base 120A and may exit from the base 120A through any of the above described output openings, including the output opening 192 shown in FIG. 6.

A heat exchange device may be provided within the base 120A and within the path of the air flow 60. The heat exchange device may include fins, for example.

Figure 7:
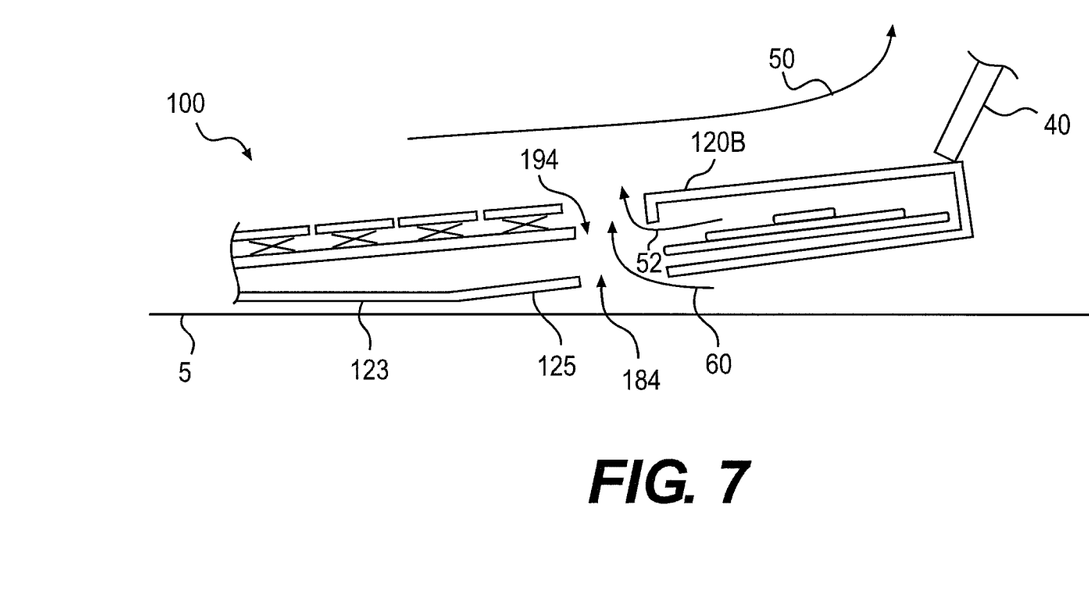
FIG. 7 is a cross-sectional side view of a passively cooled computer according to an example embodiment.

FIG. 7 is a cross-sectional side view of a passively cooled computer (or electronic device) according to an example embodiment. Other embodiments and configurations may also be provided.

More specifically, FIG. 7 shows the computer 100 having a base 120B and the lid 40 in an opened state (or opened position). A hinge device may be coupled to the lid 40 and to the base 120B.

The base 120B of the computer 100 may be provided on the support surface 5, such as a flat surface of a desk or a table.

FIG. 7 shows that the base 120B includes a top portion and a bottom portion. The bottom portion may include the first bottom part 123 and the second bottom part 125. The first bottom part 123 may be a substantially flat surface (or define a first plane), and the second bottom part 125 may be a substantially flat surface (or define a second plane). The first bottom part 123 and the second bottom part 125 may be provided in a wedge configuration, for example. In the wedge configuration, the second bottom part 125 may not be parallel to the first bottom part 123. The second bottom part 125 may not be aligned with the first bottom part 123. The first plane of the first bottom part 123 is not parallel (i.e., is non-planar) to the second plane of the second bottom part 125. The first bottom part 123 and the second bottom part 125 may be provided in configurations other than a wedge configuration.

For example, when the computer 100 (or electronic device) is provided on the support surface 5, the first bottom part 123 may contact the support surface 5 and the second bottom part 125 may be raised from the support surface 5, due to the wedge configuration (or shape) of the bottom of the base 120B. The second bottom part 125 may be raised such that there is a sufficient gap between the second bottom part 125 and the support surface 5 for the air flow 60. In this embodiment, a gap may be less than 10 mm under an input opening 184 to the support surface 5. This may allow air to be provided under the second bottom part 125.

The first bottom part 123 may support the computer 100 (or electronic device) on the support surface. The second bottom part 125 may be raised from the support surface 5 when the first bottom part 123 supports the computer 100 (or electronic device) on the support surface 5.

The second bottom part 125 may include the input opening 184 that allows air to flow under the second bottom surface 125 (from the rear of the computer 10), through the input opening 184 and out of the base 120B through an output opening 194 to an area over the base 120B. The air flow 60 may be into the input opening 184, then vertically (or substantially vertically) out through the output opening 194 of the base 120B to a convection plume (or natural convection plume) over the base 120B and in front of the lid 40.

The output opening 194 (of the base 120B) may be provided at an edge of the keyboard 25 on the base 120B. For example, the output opening 194 may be provided at one or a plurality of edge areas of the keyboard 25. FIG. 7 specifically shows the output opening 194 at a top edge of the keyboard 25. The output opening 194 may be an opening along an entire top edge of the keyboard 25, or the output opening 194 may be an opening (or openings) along only part of the top edge of the keyboard 25.

The output opening 194 (or openings) may also (or alternatively) be provided along a first side edge of the keyboard 25, a second side edge of the keyboard 25, and/or a bottom edge of the keyboard 25.

The output opening (or openings) may also (or alternatively) be provided along any edge of a touch pad on the base 120B. The output opening (or openings) may be provided at other areas on a top surface of the base 120B.

The air flow 60 that enters into the base 120B through the input opening 184 may exit from the base 120B through any of the above described output openings, including the output opening 194 shown in FIG. 7.

The output opening 194 of a top portion of the base 120B may be aligned with the input opening 184 of a bottom portion of the base 120B.

A heat exchange device may be provided within the base 120B and within the flow of the air flow 60. The heat exchange device may include fins, for example.

The convection plume 50 may pull or suck air 52 from an area at the processor 34 (or other component). The air 52 may be pulled out through opening 194.

Embodiments have been described with respect to a bottom portion (of a base) that includes a first bottom part and a second bottom part arranged in a wedge configuration. However, embodiments are not limited to this configuration.

Figure 8:
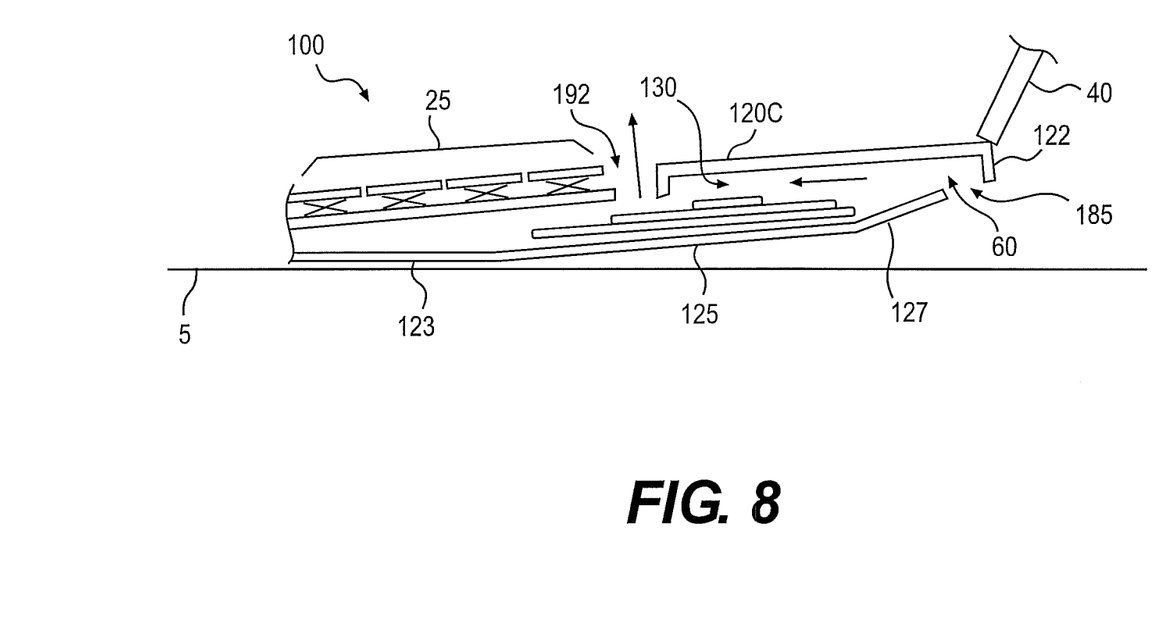
FIG. 8 is a cross-sectional side view of a passively cooled computer according to an example embodiment.

Embodiments may include a bottom portion (of a base) that includes a first bottom part, a second bottom part and a third bottom part. As one example, FIG. 8 shows a base 120 having a bottom portion that includes the first bottom part 123, the second bottom part 125 and a third bottom part 127. The first bottom part 123 may contact the support surface 5 to provide stability to the computer 100. The second bottom part 125 may extend from the first bottom part 123 at a first particular angle. Additionally, the third bottom part 127 may extend from the second bottom part 125 at a second particular angle. In this configuration, the bottom portion may include three (or more) separate surfaces. An input opening 185 may be provided on the third bottom part 127 at an area near a rear side 122 of the base 120C.

The third bottom part 127 may include the input opening 185 that allows air to flow into the input opening 185 (from the rear of the computer) and out the output opening 192 (of the base) to an area above the base 120C. The third bottom part 127 may be a surface of the bottom portion (of the base) closest to the rear side 122 of the computer 100.

In each of the above described embodiments, the input opening may be a single opening or may be a plurality of openings, such as being on the left and the right of the second bottom part and/or the third bottom part. The input and output openings may be vents or have vent surfaces within the input and output opening(s).

Embodiments may include a base that has a bottom portion with two separate surfaces, where a first surface may be substantially parallel to a support surface and the a second surface may be slanted up from the first surface so that air flow may enter thru an opening(s) provided on the second surface.

Embodiments may include a base that has a bottom portion with at least three separate surfaces, where a first surface may be substantially parallel to a support surface, a second surface may be slanted up from the first surface, and a third surface may be slanted up from the second surface. An opening (or vent) may be provided on the third surface so that air flow may enter thru the opening on the bottom of the electronic device.

An output opening of a top portion of the base may be aligned with an input opening on a bottom portion of the base such that air may flow from over a processor to dissipate heat out from the output opening.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a lid having a display; and
   a base having a top portion and a bottom portion, the bottom portion including a first bottom part and a second bottom part, the first bottom part to define a first plane, and the second bottom part to define a second plane, the second plane being non-planar with the first plane, and
   the second bottom part including an input opening to receive an air flow from outside the electronic device,
   the top portion of the base including an output opening, and
   the input opening and the output opening to allow air to flow from a rear of the electronic device, under the second bottom part, into the input opening and through an inside portion of the base along a longitudinal direction of the base, and to outside the output opening of the base.

2. The electronic device of claim 1, wherein the first bottom part and the second bottom part have a wedge configuration.

3. The electronic device of claim 1, wherein the output opening is provided at an edge of a keyboard provided on the base.

4. The electronic device of claim 1, wherein the output opening is provided at an edge of a touch pad provided on the base.

5. The electronic device of claim 1, wherein the output opening of the top portion is aligned such that air to flow along the inside portion of the base over a processor and out from the output opening.

6. The electronic device of claim 1, wherein the base includes a processor, and the air that flows through the inside portion of the base to flow over the processor and to dissipate heat from the processor.

7. The electronic device of claim 1, wherein the base includes a heat exchange device.

8. The electronic device of claim 1, wherein the lid has a first side and a second side, the first side of the lid to be adjacent to the top portion of the base when the electronic device is in a closed state, and the first side of the lid to be separated from the top portion of the base when the electronic device is in an opened state.

9. The electronic device of claim 8, further comprising a hinge device to allow the lid to move relative to the base between the closed state and the opened state.

10. The electronic device of claim 1, wherein a convection plume over the base to pull air away from a processor and out the output opening of the base and into the convection plume.

11. An electronic device comprising:
    a lid to support a display; and
    a base to support a processor and a keyboard, the base including a top portion and a bottom portion, the bottom portion including a first bottom part and a second bottom part, the first bottom part and the second bottom part have a wedge configuration, the first bottom part to support the electronic device on a support surface, and the second bottom part to be raised from the support surface when the first bottom part supports the electronic device on the support surface, and
    the second bottom part including an input opening,
    the top portion of the base including an output opening, and
    air to flow from behind the electronic device, under the second bottom part into the input opening, through an inside portion of the base and to exit the base through the output opening at a top edge of the keyboard between the keyboard and the lid.

12. The electronic device of claim 11, wherein the output opening is provided at an edge of a touch pad provided on the base.

13. The electronic device of claim 11, wherein the output opening of the top portion is vertically aligned with the input opening of the bottom portion.

14. The electronic device of claim 11, wherein the output opening of the top portion is aligned such that air to flow along an inside portion of the base over the processor and out from the output opening at the top edge of the keyboard.

15. The electronic device of claim 11, wherein the input opening and the output opening to allow air to pass from under the electronic device to a front of the electronic device, and the air to remove a portion of the heat received from the processor.

16. The electronic device of claim 11, wherein the base includes a heat exchange device.

17. The electronic device of claim 11, wherein a convection plume over the base to pull air away from the processor and out the output opening of the base and into the convection plume.

18. An electronic device comprising:
    a lid having a display; and
    a base having a keyboard and an output opening on a first portion, and the base having a second portion that includes a first part to support the base on a support surface and a second part having an input opening to receive an air flow from outside the electronic device, and the first part and the second part have a wedge configuration, and the input opening and the output opening to allow air to flow from a rear of the electronic device, under the second part of the electronic device, into the input opening and through an inside portion of the base along a longitudinal direction of the base, and to exit from the output opening of the base.

19. The electronic device of claim 18, wherein the input opening is provided at a bottom portion of the base.

20. The electronic device of claim 18, wherein the input opening is provided at a back part of the second portion of the base.

21. The electronic device of claim 18, wherein the output opening is provided at an edge of the keyboard provided at the base.

22. The electronic device of claim 18, wherein the output opening of the top portion is aligned with the input opening of the bottom portion such that air to flow over a processor and out from the output opening.

23. The electronic device of claim 18, wherein a convection plume over the base to pull air away from a processor and out from the output opening of the base and into the convection plume.

24. The electronic device of claim 1, wherein the output opening is at a top edge of a keyboard on the base between the keyboard and a hinge.

25. The electronic device of claim 11, wherein the output opening is at a top edge of the keyboard between the keyboard and a hinge.

26. The electronic device of claim 18, wherein the output opening is provided at an edge of a touch pad provided on the base.

* * * * *